United States Patent
Hamilton et al.

(10) Patent No.: US 9,836,370 B2
(45) Date of Patent: Dec. 5, 2017

(54) BACKUP MEMORY ADMINISTRATION USING AN ACTIVE MEMORY DEVICE AND A BACKUP MEMORY DEVICE

(75) Inventors: Jeffrey R. Hamilton, Pittsboro, NC (US); Melba I. Lopez, Raleigh, NC (US); Ross L. Mickens, Cary, NC (US); Markesha F. Parker, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 313 days.

(21) Appl. No.: 12/949,405

(22) Filed: Nov. 18, 2010

(65) Prior Publication Data

US 2012/0131290 A1    May 24, 2012

(51) Int. Cl.
G06F 11/16    (2006.01)
G06F 11/20    (2006.01)

(52) U.S. Cl.
CPC ...... G06F 11/2094 (2013.01); G06F 11/1662 (2013.01)

(58) Field of Classification Search
CPC .......................... G06F 11/2094; G06F 11/1662
See application file for complete search history.

(56) References Cited

U.S. PATENT DOCUMENTS

| | | | | |
|---|---|---|---|---|
| 6,073,220 A | * | 6/2000 | Gunderson | G06F 11/1456 711/112 |
| 6,304,980 B1 | * | 10/2001 | Beardsley | G06F 11/2064 707/999.202 |
| 6,798,353 B2 | | 9/2004 | Seal et al. | |
| 7,251,708 B1 | * | 7/2007 | Justiss et al. | 711/111 |
| 7,257,690 B1 | | 8/2007 | Baird | |
| 7,360,039 B2 | | 4/2008 | De Jong et al. | |
| 7,362,618 B2 | | 4/2008 | Harari et al. | |
| 7,433,245 B2 | | 10/2008 | Otsuka et al. | |
| 7,461,196 B2 | | 12/2008 | Kawamura et al. | |
| 7,646,636 B2 | | 1/2010 | Kim | |

(Continued)

FOREIGN PATENT DOCUMENTS

JP    2009211196 A    9/2009

OTHER PUBLICATIONS

Leventhal, "Mirroring Flash SSDs", Weblog, oracle.com (online), May 26, 2009 [accessed Jun. 12, 2012], 7 pp., URL: https://blogs.oracle.com/ahl/entry/mirroring_flash_ssds.

(Continued)

Primary Examiner — Michael Krofcheck
(74) Attorney, Agent, or Firm — Brandon C. Kennedy; Jason A. Friday; Kennedy Lenart Spraggins LLP

(57) ABSTRACT

Methods, systems, and computer program products for backup memory administration are provided. Embodiments include storing in an active memory device, by a memory backup controller, blocks of computer data received from random access memory; recording in a change log, by the memory backup controller, identifications of each block of computer data that is stored in the active memory device; detecting, by the memory backup controller, a backup trigger event; and responsive to the detecting of the backup trigger event: copying, by the memory backup controller, from the active memory device, to a backup memory device, the blocks of data identified in the change log; and clearing, by the memory backup controller, the change log.

8 Claims, 3 Drawing Sheets

(56) References Cited

U.S. PATENT DOCUMENTS

| | | | |
|---|---|---|---|
| 7,702,852 B2 | 4/2010 | Kawaguchi et al. | |
| 2003/0056062 A1* | 3/2003 | Prabhu | 711/143 |
| 2003/0088592 A1* | 5/2003 | Innan et al. | 707/204 |
| 2005/0235016 A1* | 10/2005 | Amano et al. | 707/204 |
| 2005/0240637 A1* | 10/2005 | Kawamura | 707/204 |
| 2006/0059322 A1* | 3/2006 | Poston | 711/162 |
| 2006/0069931 A1 | 3/2006 | Shin et al. | |
| 2006/0198202 A1 | 9/2006 | Erez | |
| 2007/0266215 A1 | 11/2007 | Okada et al. | |
| 2008/0222371 A1 | 9/2008 | Caulkins | |
| 2009/0055574 A1 | 2/2009 | Chen et al. | |
| 2009/0172253 A1 | 7/2009 | Rothman et al. | |
| 2010/0030982 A1* | 2/2010 | Sela et al. | 711/162 |

OTHER PUBLICATIONS

Pcstats, "AMD Intros First Mirror Bit Flash Device", pcstats.com (online), May 13, 2002, [accessed Jun. 12, 2012], 2 pp., URL: http://www.pcstats.com/releaseview.cfm?releaseID=873.

Hewlett-Packard, "Server Virtualization Technologies for x86-Based HP Bladesystem and HP Proliant Servers", technology brief, 3rd edition, www.hp.com (online), Jan. 2009 [accessed Jun. 12, 2012], 21 pp., URL: http://h20000.www2.hp.com/bc/docs/support/SupportManual/c01067846/c01067846.pdf.

Launchpad, "Redundant Backups To 2 USB Sticks", Back in Time Questions, Question #91737, launchpad.net (online), Nov. 25, 2009 [accessed Jun. 12, 2012], 2 pp., URL: https://answers.launchpad.net/backintime/+question/91737.

University of Eastern Finland, "USB Stick RAID In ACTION!", www.uef.fi (online), Aug. 2005 [accessed Jun. 12, 2012], 5 pp., URL: http://cs.joensuu.fi/~mmeri/usbraid/.

* cited by examiner

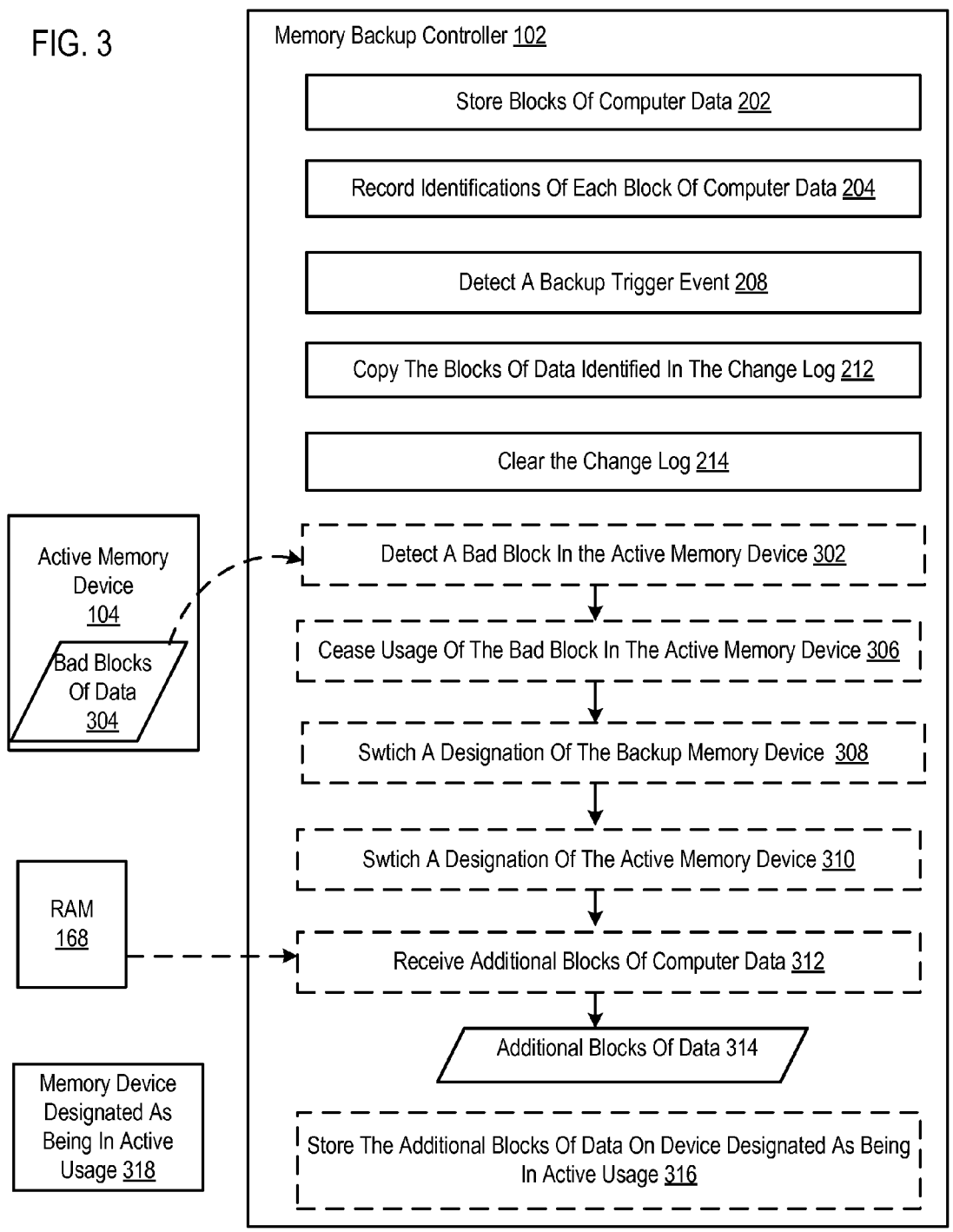

BACKUP MEMORY ADMINISTRATION USING AN ACTIVE MEMORY DEVICE AND A BACKUP MEMORY DEVICE

BACKGROUND OF THE INVENTION

Field of the Invention

The field of the invention is data processing, or, more specifically, methods, systems, and computer program products for backup memory administration.

Description of Related Art

Flash memory devices have a finite number of erase-write cycles. Most commercially available flash memory devices are guaranteed to withstand around 100,000 write-erase cycles before the wear begins to deteriorate the integrity of the memory device. Deterioration in the integrity of the memory device may result in loss of data.

SUMMARY OF THE INVENTION

Methods, systems, and computer program products for backup memory administration are provided. Embodiments include storing in an active memory device, by a memory backup controller, blocks of computer data received from random access memory; recording in a change log, by the memory backup controller, identifications of each block of computer data that is stored in the active memory device; detecting, by the memory backup controller, a backup trigger event; and responsive to the detecting of the backup trigger event: copying, by the memory backup controller, from the active memory device, to a backup memory device, the blocks of data identified in the change log; and clearing, by the memory backup controller, the change log.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 3 sets forth a flow chart illustrating another exemplary method for backup memory administration according to embodiments of the present invention.

DETAILED DESCRIPTION OF EXEMPLARY EMBODIMENTS

Figure 1:
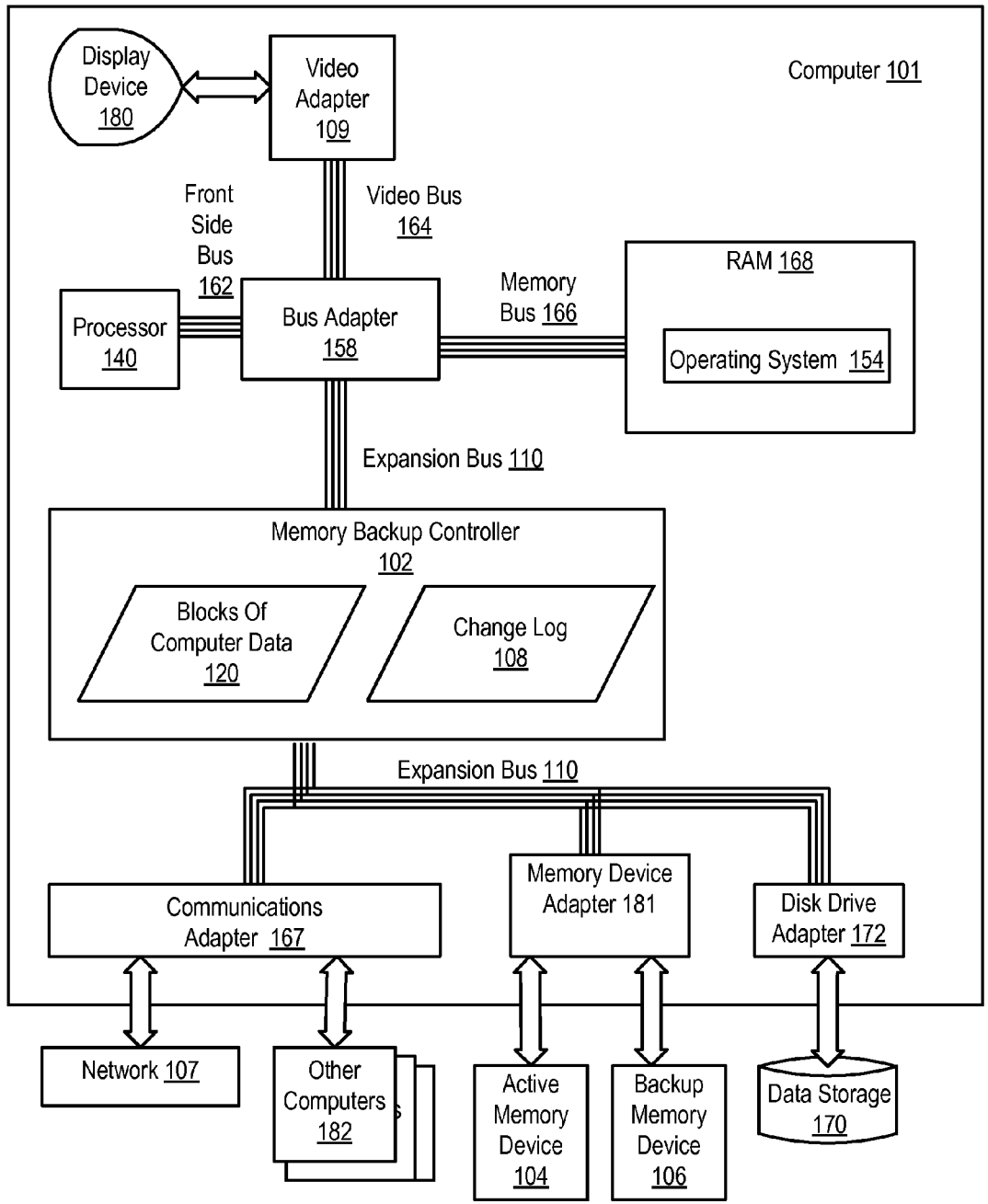
FIG. 1 sets forth a diagram of an example computer for backup memory administration according to embodiments of the present invention.

Exemplary methods, apparatuses, and products for backup memory administration in accordance with the present invention are described with reference to the accompanying drawings, beginning with FIG. 1. FIG. 1 sets forth a diagram of a example computer (101) for backup memory administration according to embodiments of the present invention. The example computer (101) of FIG. 1 includes a processor (140) or 'CPU' as well as random access memory (168) ('RAM'), which is connected through a high speed memory bus (166) and bus adapter (158) to the processor (140), and connected to a memory backup controller (102) through an expansion bus (110).

Stored in RAM (168) is an operating system (154). Operating systems useful for backup memory administration according to embodiments of the present invention include UNIX™, Linux™, Microsoft XP™, AIX™, IBM's i5/OS™, and others as will occur to those of skill in the art. The operating system (154) is shown in RAM (168), but many components of such software typically are stored in non-volatile memory also, such as, for example, on a disk drive (170).

The example computer (101) of FIG. 1 includes a disk drive adapter (172) coupled through the expansion bus (110) and the bus adapter (158) to the processor (140) and other components of the example computer (101). The disk drive adapter (172) connects non-volatile data storage to the example computer (101) in the form of the disk drive (170). Disk drive adapters useful in computers for backup memory administration according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (101) of FIG. 1 includes one or more input/output ('I/O') adapters (178). I/O adapters implement user-oriented input/output through, for example, software drivers and computer hardware for controlling output to display devices such as computer display screens. The example computer (101) of FIG. 1 includes a video adapter (109), which is an example of an I/O adapter specially designed for graphic output to a display device (180) such as a display screen or computer monitor. The video adapter (109) is connected to the processor (140) through a high speed video bus (164), bus adapter (158), and the front side bus (162), which is also a high speed bus.

The example computer (101) of FIG. 1 includes a communications adapter (167) for data communications with other computers (182) and for data communications with a data communications network (106). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for backup memory administration according to embodiments of the present invention include modems for wired dial-up communications, Ethernet (IEEE 802.3) adapters for wired data communications network communications, and 802.11 adapters for wireless data communications network communications.

The processor (140) of FIG. 1 is configured to transfer data over the expansion bus (110) to the memory backup controller (102). An expansion bus includes electronic pathways which move information between components of a computer system. The expansion bus (110) of FIG. 1 may be any type of bus that establishes communication between a device and a host controller. For example, the expansion bus (110) may be a universal serial bus (USB), a small computer system interface (SCSI) bus, a peripheral component interconnect express (PCIe) bus, a parallel attachment packet interface (ATAPI) bus, and so on. The processor (140) and the memory backup controller (102) of FIG. 1 each include an interface for connection to the expansion bus (110). An interface is a point of interaction between two devices or pathways. The processor (140) and the memory backup controller (102) of FIG. 1 may include a USB interface, a SCSI interface, a PCIe interface, a ATAPI interface, and so on.

The memory backup controller (102) of FIG. 1 is configured to route blocks of computer data (120) received from the random access memory (RAM) (168) over the expansion bus (110) to either an active memory device (104) or a backup memory device (106). A memory backup controller is a digital circuit which manages the flow of data going to and from memory storage devices. A memory storage device typically consists of a small printed circuit board that includes flash memory and a connector, such as a USB interface, for communicating with the memory backup controller (102). The memory backup controller (102) is configured to designate the memory storage devices (104, 106) as either being in active usage or backup usage. The active memory device (104) of FIG. 1 is in active usage and the backup memory device (106) is in backup usage. When the active flash storage device (104) is operational, the memory backup controller (102) stores the blocks of computer data (120) on the active flash storage device (104). When the active flash storage device (104) is not operational and the backup flash storage device (106) is operational, the memory backup controller (102) stores the blocks of computer data (120) on the backup flash storage device (106).

The memory backup controller (102) of FIG. 1 includes a change log (108). The change log (108) includes identifications of each block of data written to the active memory device (104). When the memory backup controller (102) writes the blocks of computer data (120) to the active storage device (104), the memory backup controller (102) is configured to store in the change log (108), the identifications of each block of data written to the active memory device (104).

The memory backup controller (102) of FIG. 1 is configured to detect a backup trigger event. A backup trigger event may be triggered in response to any number of conditions, such as an expiration of a predetermined period of time, a change in the power state of the processor (140) or one of the memory devices (104, 106), occurrence of a particular time, detection that the change log is full of recordings. In response to detecting a backup trigger event, the backup memory controller (102) is configured to copy, from the active memory device (104), to the backup memory device (106), all blocks of data identified in the change log (108). The backup memory controller (102) of FIG. 1 is also configured to clear the change log (108) in response to detecting the backup trigger event.

The memory backup controller (102) of FIG. 1 is also configured to detect a bad block of data in the active memory device (104). The backup trigger event may include an electronic signal sent from one or more components of the example computer (101). A bad block of data includes a single bit error or multi-bit errors. In response to detecting a bad block of data in the active memory device (104), the memory backup controller (102) records an identification associated with the detected bad block, stops using the bad block in the active memory device (106), and switches the backup memory device (106) to active usage and the active memory device (104) to backup usage.

Figure 2:
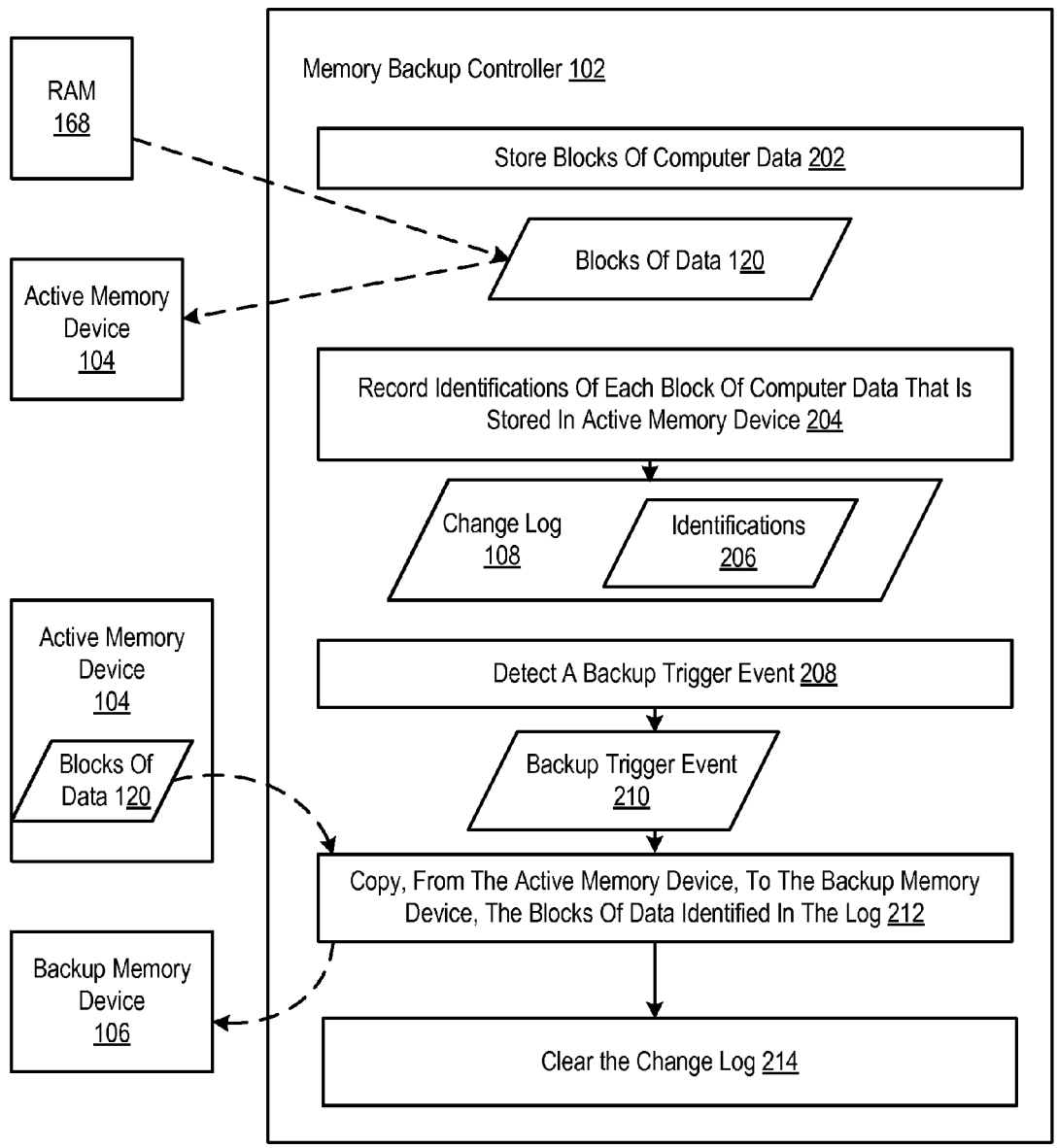
FIG. 2 sets forth a flow chart illustrating an exemplary method for backup memory administration according to embodiments of the present invention.

For further explanation, FIG. 2 sets forth a flow chart illustrating an exemplary method for backup memory administration according to embodiments of the present invention. The method of FIG. 2 includes storing (202) in an active memory device (104), by a memory backup controller (102), blocks of computer data (120) received from RAM (168). Storing (202) in the active memory device (104) the blocks of the computer data (120) received from random access memory (168) may be carried out by receiving the blocks of computer data (120) over the expansion bus (110) from the random access memory (168), establishing a connection between the memory backup controller (102) and the active memory device (104), and transmitting the received blocks of computer data (120) to the active memory device (104).

The method of FIG. 2 also includes recording (204) in a change log (108), by the memory backup controller (102), identifications (206) of each block of computer data (120) that is stored in the active memory device (104). Recording (204) in the change log (108) the identifications (206) of each block of computer data (120) that is stored in the active memory device (104) may be carried out by tracking transmission of blocks of data to the active memory device (104), storing identifications (206) of blocks that are stored in the active memory device (104), and storing in local memory in the memory backup controller (102) the identifications (206) within the memory backup controller (102).

The method of FIG. 2 includes detecting (208), by the memory backup controller (102), a backup trigger event (210). Detecting (208) a backup trigger event (210) may be carried out by receiving a command from a processor via the expansion bus (110) indicating that a backup trigger event (210) is occurring, comparing a current time with a predetermined time, and determining a storage capacity level of the change log (108).

The method of FIG. 2 includes responsive to detecting (208) of the backup trigger event (210), copying (212), by the memory backup controller (102), from the active memory device (104), to a backup memory device (106), the blocks of data identified in the change log (108). Copying (212) from the active memory device (104) to the backup memory device (106), the block of data identified in the change log (108) may be carried out by establishing a connection between the memory backup controller (102) and the active memory device (104), receiving the identified blocks of data from the active memory device (104), temporarily storing the identified blocks of data (12), and transmitting the blocks of data (120) to the backup memory device (106).

The method of FIG. 2 includes responsive to the detecting (208) of the backup trigger event (210), clearing (214), by the memory backup controller (102), the change log (108). Clearing (214) the change log (108) may be carried out by resetting bits of data within the change log (108) and changing values of variables within or associated with the change log (108).

For further explanation, FIG. 3 sets forth a flow chart illustrating another exemplary method for backup memory administration according to embodiments of the present invention. The method of FIG. 3 includes the following elements of the method of FIG. 2: storing (202) in an active memory device (104), by a memory backup controller (102), blocks of computer data (120) received from random access memory (168); recording (204) in a change log (108), by the memory backup controller (102), identifications (206) of each block of computer data that is stored in the active memory device (104); detecting (208), by the memory backup controller (102), a backup trigger event (210); responsive to the detecting of the backup trigger event (210), copying (212), by the memory backup controller (102), from the active memory device (104), to a backup memory device (106), the blocks of data identified in the change log (108); and responsive to the detecting of the backup trigger event, clearing (214), by the memory backup controller (102), the change log (108).

The elements of FIG. 3 that differ from the method of FIG. 2 are illustrated in FIG. 3 with a dashed line. More particularly, those elements include: detecting (302), by the memory backup controller (102), a bad block (304) in the active memory device (104); ceasing (306), by the memory backup controller (102), usage of the bad block (304) in the active memory device (104); switching (308), by the memory backup controller (102), a designation of the backup memory device (106) from backup usage to active usage; and switching (310), by the memory backup controller (102), a designation of the active memory device (104) from active usage to backup usage.

The method of FIG. 3 includes detecting (302), by the memory backup controller (102), a bad block (304) in the active memory device (104). Detecting (302) a bad block (304) in the active memory device (104) may be carried out by receiving error correction codes (ECC) data from the active memory device (104) and determining if the ECC data indicates a bad block of data within the active memory device (104).

The method of FIG. 3 also includes ceasing (306), by the memory backup controller (102), usage of the bad block (304) in the active memory device (104). Ceasing (306) the usage of the bad blocks (304) in the active memory device (104) may be carried out by the memory backup controller (102) changing a bit to indicate that the active memory device (104) includes a bad block of data and directing all read and writes to the backup memory device (106).

The method of FIG. 3 includes switching (308), by the memory backup controller (102), a designation of the backup memory device (106) from backup usage to active usage. Switching (308) the designation of the backup memory device (106) may be carried out by setting one or more bits to indicate the backup memory device (106) is to receive future blocks of data to be written and setting one or more bits to indicate that the backup memory device (106) is to be used to retrieve data requested via an expansion bus.

The method of FIG. 3 also includes switching (310), by the memory backup controller (102), a designation of the active memory device (104) from active usage to backup usage. Switching (310) the designation of the active memory device (104) from active usage to backup usage may be carried out by setting one or more bits to indicate the active memory device (104) is to not receive future blocks of data to be written and setting one or more bits to indicate that the active memory device (104) is not to be used to retrieve data requested via an expansion bus.

The method of FIG. 3 includes receiving (312), by the memory backup controller (102), additional blocks of computer data (314) from the random access memory (168). Receiving (312) the additional blocks of computer data (314) from the random access memory (168) may be carried out by establishing a connection with an expansion bus via an interface and receiving data over an expansion bus.

The method of FIG. 3 also includes responsive to the designations of the active memory device (104) and the backup memory device (106), storing (316), by the memory backup controller (102), the additional blocks of computer data (314) on a memory device designated as being in active usage. Storing (316) the additional blocks of computer data (314) on a memory device designated as being in active usage may be carried out by determining which memory device (318) is in active usage, establishing a connection with the identified memory device (318) in active usage, and routing the data to the identified memory device (318) in active usage.

Exemplary embodiments of the present invention are described largely in the context of a fully functional computer system for backup memory administration. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for backup memory administration, the system comprising:
    random access memory;
    a memory backup controller coupled to the random access memory, wherein the memory backup controller is configured to:
    store in an active memory device blocks of computer data received from the random access memory, wherein the active memory device comprises a first flash memory and is communicably coupled to the memory backup controller via a memory device adapter by a first connector connecting the active memory device to the memory device adapter;
    record in a change log identifications of each block of computer data that is stored in the active memory device;
    detect a backup trigger event;
    responsive to the detecting of the backup trigger event: copy from the active memory device, to a backup memory device, the blocks of data identified in the change log, wherein the backup memory device comprises a second flash memory and is communicably coupled to the memory backup controller via the memory device adapter by a second connector connecting the backup memory device to the memory device adapter, wherein the first connector and the second connector are independent of each other; and clear the change log, wherein the backup trigger event is triggered in response to one of a change in a power state of a processor and a change in the power state of the memory backup controller;
    in response to detecting a bad block of data in the active memory device: cease usage of the bad block in the active memory device, switch a designation of the backup memory device from backup usage to active usage; and switch a designation of the active memory device from active usage to backup usage, wherein detecting the bad block in the active memory device includes detecting at least one of a single bit error and a multi-bit error.

2. The system of claim 1, wherein the memory backup controller is further configured to:
    receive additional blocks of computer data from the random access memory;
    responsive to the designations of the active memory device and the backup memory device, store the additional blocks of computer data on a memory device designated as being in active usage.

3. The system of claim 1, further comprising an expansion bus, wherein the memory backup controller is coupled to a processor through the expansion bus.

4. The system of claim 3, wherein the expansion bus includes a type selected from the group consisting of a universal serial bus (USB), a small computer system interface (SCSI) bus, a peripheral component interconnect express (PCIe) bus, and a parallel attachment packet interface (ATAPI) bus.

5. The system of claim 1, wherein detecting the bad block in the active memory device further comprises receiving error correction codes (ECC) data from the active memory device indicating one of a single bit error and a multi-bit error.

6. A computer program product for backup memory administration, the computer program product comprising:
   a computer readable storage medium having computer readable program code embodied therewith, wherein the computer readable storage medium is not a signal, the computer readable program code comprising:
   computer readable program code configured to:
   store in an active memory device, by a memory backup controller, blocks of computer data received from random access memory, wherein the active memory device comprises a first flash memory and is communicably coupled to the memory backup controller via a memory device adapter by a first connector connecting the active memory device to the memory device adapter;
   record in a change log identifications of each block of computer data that is stored in the active memory device;
   detect a backup trigger event;
   responsive to the detecting of the backup trigger event:
   copy from the active memory device, to a backup memory device, the blocks of data identified in the change log, wherein the backup memory device comprises a second flash memory and is communicably coupled to the memory backup controller via the memory device adapter by a second connector connecting the backup memory device to the memory device adapter, wherein the first connector and the second connector are independent of each other;
   clear the change log, wherein the backup trigger event is triggered in response to one of a change in a power state of a processor and a change in the power state of the memory backup controller; and
   in response to detecting a bad block of data in the active memory device: cease usage of the bad block in the active memory device, switch a designation of the backup memory device from backup usage to active usage; and switch a designation of the active memory device from active usage to backup usage, wherein detecting the bad block in the active memory device includes detecting at least one of a single bit error and a multi-bit error.

7. The computer program product of claim 6, wherein the computer readable program code is further configured to:
   receive additional blocks of computer data from the random access memory;
   responsive to designations of the active memory device and the backup memory device, store the additional blocks of computer data on a memory device designated as being in active usage.

8. The computer program product of claim 6, wherein detecting the bad block in the active memory device further comprises receiving error correction codes (ECC) data from the active memory device indicating one of a single bit and a multi-bit error.

* * * * *